(12) United States Patent
Boyd et al.

(10) Patent No.: US 12,527,326 B1
(45) Date of Patent: Jan. 20, 2026

(54) INDOXACARB SUSPENSION CONCENTRATE FORMULATIONS

(71) Applicant: Control Solutions, Inc., Pasadena, TX (US)

(72) Inventors: Mark Allen Boyd, Seabrook, TX (US); Marie Ann Knox, Lighthouse Point, FL (US); Janis Johnson Reed, Seabrook, TX (US); J. Chance Peck-Pearce, Pasadena, TX (US); Jacob Nathaneil King, Houston, TX (US)

(73) Assignee: Control Solutions, Inc., Pasadena, TX (US)

( * ) Notice: Subject to any disclaimer, the term of this patent is extended or adjusted under 35 U.S.C. 154(b) by 0 days.

(21) Appl. No.: 19/000,003

(22) Filed: Dec. 23, 2024

(51) Int. Cl.
| | |
|---|---|
| *A01N 43/88* | (2006.01) |
| *A01N 25/04* | (2006.01) |
| *A01N 25/06* | (2006.01) |
| *A01N 25/12* | (2006.01) |
| *A01N 25/22* | (2006.01) |
| *A01N 25/30* | (2006.01) |
| *A01N 43/40* | (2006.01) |
| *A01N 43/50* | (2006.01) |
| *A01N 47/34* | (2006.01) |
| *A01P 7/04* | (2006.01) |

(52) U.S. Cl.
CPC ............. *A01N 43/88* (2013.01); *A01N 25/04* (2013.01); *A01N 25/06* (2013.01); *A01N 25/12* (2013.01); *A01N 25/22* (2013.01); *A01N 25/30* (2013.01); *A01N 43/40* (2013.01); *A01N 43/50* (2013.01); *A01N 47/34* (2013.01); *A01P 7/04* (2021.08)

(58) Field of Classification Search
CPC ........... A01P 7/04; A01N 25/02; A01N 25/34; A01N 43/88; A01N 47/38
See application file for complete search history.

(56) References Cited

U.S. PATENT DOCUMENTS

| 2012/0156273 A1* | 6/2012 | Gutsmann | A01N 25/28 424/405 |
| 2022/0151235 A1* | 5/2022 | Carespodi | A01N 25/006 |
| 2023/0189797 A1* | 6/2023 | Borane | A01P 7/04 504/363 |

FOREIGN PATENT DOCUMENTS

CN 104886109 * 9/2015

OTHER PUBLICATIONS

Food and Agricultural Organization of the United Nations (https://openknowledge.fao.org/server/api/core/bitstreams/62041353-be03-40f1-b73f-7236780cdd82/content, FAO, Dec. 19, 2018) (Year: 2018).*
Herman (https://www.bqa.org/about-us/newsroom/insect-control-and-improving-cattle-health, Mar. 20 22023). (Year: 2023).*
Australian Pesticides and Veterinary Medicines Authority (Australian Government, 2016) (Year: 3026).*
CN 104886109—English translation, 2015 (Year: 2015).*
Moncada (https://cdn.branchcms.com/WejJPKldRq-1556/docs/indoxacarb.v9.pdf, Mar. 2003) (Year: 2003).*

* cited by examiner

*Primary Examiner* — Umamaheswari Ramachandran
(74) *Attorney, Agent, or Firm* — POLSINELLI PC (57) ABSTRACT

Compositions and methods for controlling pests are disclosed. The compositions comprise a solid particulate of a voltage-dependent sodium channel blocker and methods of using the voltage-dependent sodium channel blocker to control a target pest. The voltage-dependent sodium channel blocker is active in its solid form and provides control of current and future pest generations independent of application timing with respect to insect life stage.

18 Claims, 4 Drawing Sheets

INDOXACARB SUSPENSION CONCENTRATE FORMULATIONS

FIELD OF INVENTION

The present disclosure provides pesticidal compositions comprising pesticidally active solid particulates of voltage-dependent sodium channel blockers.

BACKGROUND

Indoxacarb exhibits activity against at least 10 orders of insects including various pests: Lepidoptera, Coleoptera, Hemiptera, and Blattodea.

Indoxacarb is currently used in crop production and on turf as an emulsifiable concentrate or a wettable dispersible granule. Steward® EC by FMC is used to control corn root worms, alfalfa weevil and other pests primarily in cotton. Advion®, Provaunt® and Arilon® WDG are available from Syngenta® for crop and non-crop uses on turf and ornamental plants.

These currently available formulations face dissimilar challenges in the field. On sensitive plant tissue, Emulsifiable Concentrates/solvent based insecticides can cause phytotoxicity, especially on highly managed turfgrass on golf courses. Water dispersible granules are safe on sensitive plants, but can cause fast wear on pumps, hoses, fittings, and other components of spray equipment.

Accordingly, there is a need for pesticidal formulations that can be used for reduced phytotoxicity, reduced equipment wear, and effective control of pests infesting structures, turfgrass, ornamental plants, and trees.

BRIEF SUMMARY

DETAILED DESCRIPTION

The present disclosure is based in part on the discovery that voltage-dependent sodium channel blockers, when applied in the form of a solid particulate, have surprisingly and counter-intuitively exhibited stability in formulation when compared to industry standard emulsifiable concentrate and water dispersible granule compositions. Importantly, the ability to control current and future generations of pests with currently used application equipment and without concern for damaging the plants where the application is occurring greatly simplifies pest management programs, increases the chance of operators rotating active ingredients thus decreasing the chances of resistance to pesticides, and therefore reducing fecundity further decreases the propagation of any pesticide-resistant traits already present in the adults by diminishing the size of the future generation.

I. Compositions

One aspect of the present disclosure encompasses a pesticidal composition comprising a pesticidally effective concentration of a solid particulate voltage-dependent sodium channel blocker.

Voltage-gated sodium channels are integral transmembrane proteins that are critical for electrical signaling in most excitable cells. In response to membrane depolarization, sodium channels open (activate) and allow sodium ions to flow into the cell, causing depolarization of the membrane potential. Activation of sodium channels is responsible for the rapid rising phase of action potentials. A few milliseconds after channel opening, the channel pore is occluded by an inactivation particle in the process known as fast inactivation. Fast inactivation plays an important role in the termination of action potentials and prevents excessive depolarization of the resting membrane potential. Thus, sodium channels are essential components of cellular excitability.

In some aspects, the voltage-dependent sodium channel blocker is indoxacarb, metaflumizone, or a combination thereof.

As explained above, the inventors discovered that voltage-dependent sodium channel blocker, when applied in the form of a solid particulate, can be used to effectively control a pest. As used herein, the terms "solid particulate voltage-dependent sodium channel blocker," "voltage-dependent sodium channel blocker in solid particulate form," and "solid particulate form of a voltage-dependent sodium channel blocker," when they relate to a voltage-dependent sodium channel blocker, can be used interchangeably and refer to a solid form of the voltage-dependent sodium channel blocker.

The size of the solid particulate of voltage-dependent sodium channel blocker can and will vary depending on the voltage-dependent sodium channel blocker, the target pest to be controlled, the method of application, and the location in which the target pest is to be controlled, among other variables, provided the particles in the composition are of a size compatible with the intended composition and the intended method of application of the composition. For instance, if the composition is a powder composition intended for application into the environment of the pest, each particle in the powder composition is of a size appropriate to promote dispersability of the composition in the environment of the organism. Similarly, when the composition is a suspension composition, each particle in the suspension composition is of a size appropriate to promote and maintain dispersability of the composition in a suspending vehicle. In some aspects, the composition comprises a carrier granule having the powder composition deposited thereon.

In some aspects, the size of each solid particulate comprising the voltage-dependent sodium channel blocker can be about 5 µm or less, 4 µm or less, 3 µm or less, 2 µm or less, 1 µm or less, or 0.5 µm or less. In some aspects, the size of each particle comprising the voltage-dependent sodium channel blocker is about 2.1 µm or less.

The pesticidal effective amount of voltage-dependent sodium channel blocker in the composition can range from about 5.0% to about 25% by weight (w/w). For example, the amount of voltage-dependent sodium channel blocker in the composition may range from 6.0% w/w to about 24 w/w %, 7.0% w/w to about 23 w/w %, 8.0% w/w to about 22 w/w %, 9.0% w/w to about 21 w/w %, 10.0% w/w to about 20 w/w %, 11.0% w/w to about 19 w/w %, 12.0% w/w to about 18 w/w %, 13.0% w/w to about 17 w/w %, or 14.0% w/w to about 16 w/w %.

In some aspects, the voltage-dependent sodium channel blocker is indoxacarb. In one aspect, the pesticidal effective amount of indoxacarb ranges from about 6% to about 25% by weight. In one aspect, the pesticidal effective amount of indoxacarb is 6% w/w or more.

In some aspects, the pesticidal composition further comprises an insect growth regulator (IGR). An insect growth regulator is a substance that inhibits the life cycle of an insect by interfering with the molting process. Before the instant invention, it was assumed that IGRs only function by preventing an insect from reaching maturity. IGRs suitable for the instant disclosure can be hormonal IGRs or chitin synthesis inhibitors.

Non-limiting examples of hormonal IGRs include methoprene, hydroprene, kinoprene, fenoxycarb, pyriproxyfen, and combinations thereof. In some aspects, the hormonal IGR is pyriproxyfen.

In some aspects, the IGR is a chitin synthesis inhibitor. Chitin synthesis inhibitors prevent the formation of chitin, a carbohydrate needed to form the insect's exoskeleton. Chitin synthesis inhibitors may include a broad class of benzoylphenylurea, as disclosed in U.S. Pat. No. 5,886,221 (which is incorporated herein by reference in its entirety). Non-limiting examples of suitable benzoylureas include chlorfluazuron, cyramazin, diflubenzuron, noviflumuron, flucycloxuron, flufenoxuron, hexaflumuron, lufenuron, novaluron, teflubenzuron, diflubenzuron, triflumuron, buprofezin, diofenolan, hexythiazox, etoxazole, clofentazine, lufenuron, chlorfluazuron, bistrifluron, triflumuron, and combinations thereof. In some aspects, the chitin synthesis inhibitor is novaluron, diflubenzuron, lufenuron, or combinations thereof.

In some aspects, the chitin synthesis inhibitor is a pesticidally active solid particulate chitin synthesis inhibitor. The size of particles of the solid particulate can be about 15 μm or less. The chitin synthesis inhibitor can be pesticidally active irrespective of the stage of development of the pest.

Formulations

The compositions can be formulated for application as a suspension or as a solid to control pests, depending on the target pest to be controlled as well as the method used for controlling the pest. For instance, if the target pest is a termite, the composition can be formulated as a powder and can further comprise an environmentally mimicking agent that mimics or is compatible with the environment of the termite. Similarly, the pesticidally effective concentration of solid particulate voltage-dependent sodium channel blockers in the composition can and will change depending on the target pest to be controlled as well as the intended use of the composition. In some aspects, voltage-dependent sodium channel blockers of the instant disclosure can be formulated as a solid or as a suspension.

Solid Compositions

In some aspects, the compositions are formulated as a solid according to methods well known in the art. For instance, the compositions can be formulated as a powder, granules, or any other solid form suitable for delivery of a pesticide. In some aspects, the compositions are formulated as a powder. It will be recognized that powder compositions can further be compressed into other solid forms, including granules or blocks.

In some aspects, the composition is formulated into a powder comprising the solid particulate voltage-dependent sodium channel blocker. Powder formulations are known in the art and generally comprise one or more of anticaking agents, dispersants and fillers, among other ingredients. Pesticidal powder compositions are generally applied as a dust to provide superior access to cracks and crevices that many insecticide sprays may miss for better overall pest control. Ingredients that may be used in powder formulations are described further below in this section and in Section I(c). It will be recognized that one or more of the components can exhibit more than one characteristic of the ingredients of the composition. For instance, when a composition of the disclosure comprises a clay ingredient, the clay can be an anticaking agent used to maintain the flowability of the composition, an environmentally mimicking agent for use as a building material by, e.g., termites, and a filler.

Powder compositions can also be applied onto a carrier such as carrier granules prior to application such as by broadcast distribution. Accordingly, one aspect of the present disclosure encompasses a pesticidal granule comprising a carrier granule having a powder composition of voltage-dependent sodium channel blockers deposited thereon (voltage-dependent sodium channel blocker granules). It will be recognized that a sufficient amount of the powder composition is deposited onto the carrier granules to provide a pesticidally effective concentration of the inhibitor. The pesticidally effective concentration can and will vary depending on the voltage-dependent sodium channel blocker, the method of depositing the powder onto the carrier granules, the application rate of the carrier granules, the target pest to be controlled, and the site where control of a target pest is sought, and can be determined experimentally.

The powder composition can be deposited onto carrier granules by simply spraying onto or combining the powder composition with the carrier granules. Alternatively, the powder composition can be adhered to the carrier granules using a tackifying agent. A suitable carrier granule is any granule well sized for the method of distribution of the granules, such as by broadcast distribution. For instance, a carrier granule can have a size ranging from about 0.1 millimeter to about 5 centimeters, from about 0.5 to about 2 centimeters, or from about 0.1 to about 5 millimeters. The granules are generally inert towards the voltage-dependent sodium channel blocker when applied thereon. Suitable carrier granules include fragmented materials such as rock dust, clay, corncob, cereal or grain hulls, peanut hulls, plant pulp, other plant-based cellulosic materials, clays, granular baits, and fertilizers. Non-limiting examples of carrier granules include: limestone particulate; fertilizer granules; and extruded corn granules. In some aspects, the carrier granules disintegrate after distribution. In some aspects, the carrier granules are dissolvable carrier granules. In some aspects, when the granule is a fertilizer granule and the voltage-dependent sodium channel blocker is indoxacarb, the voltage-dependent sodium channel blocker granules comprise indoxacarb ranging from about 6.0% to about 10% indoxacarb by wt, from about 10% to about 15% indoxacarb by wt, from about 15% to about 20% indoxacarb by wt, or from about 20% to about 25% indoxacarb by wt.

In some aspects, the powder composition comprises solid particulate indoxacarb. When the composition comprises solid particulate indoxacarb, the powder compositions can comprise indoxacarb at a concentration of about 6.0% w/w or more. For instance, the composition can comprise solid particulate indoxacarb at a concentration of about 6.0% w/w, 6.1% w/w, 6.2% w/w, 6.3% w/w, 6.4% w/w, 6.5% w/w, 6.6% w/w, 6.7% w/w, 6.8% w/w, 6.9% w/w, 7.0% w/w, 
7.1% w/w, 7.2% w/w, 7.3% w/w, 7.4% w/w, 7.5% w/w, 7.6% w/w, 7.7% w/w, 7.8% w/w, 7.9% w/w, 8.0% w/w, 8.1% w/w, 8.2% w/w, 8.3% w/w, 8.4% w/w, 8.5% w/w, 8.6% w/w, 8.7% w/w, 8.8% w/w, 8.9% w/w, 9.0% w/w, 9.1% w/w, 9.2% w/w, 9.3% w/w, 9.4% w/w, 9.5% w/w, 9.6% w/w, 9.7% w/w, 9.8% w/w, 9.9% w/w, 10% w/w, 10.5% w/w, 11% w/w, 11.5% w/w, 12% w/w, 12.5% w/w, 13% w/w, 13.5% w/w, 14%, w/w 14.5% w/w, 15% w/w, 15.5% w/w, 16% w/w, 16.5% w/w, 17% w/w, 17.5% w/w, 18% w/w, 18.5% w/w, 19% w/w, 19.5% w/w, 20% w/w, 20.1% w/w, 20.2% w/w, 20.3% w/w, 20.4% w/w, 20.5% w/w, 20.6% w/w, 20.7% w/w, 20.8% w/w, 20.9% w/w, 21% w/w, 21.5% w/w, 22% w/w, 22.5% w/w, 23% w/w, 23.5% w/w, 24% w/w, 24.5% w/w, 25% w/w or more. In one aspect, the composition comprises solid particulate indoxacarb at a concentration of about 7.0% w/w or more. In one embodiment, the composition comprises solid particulate indoxacarb at a concentration of about 6.4% w/w or more. In another embodiment, the composition comprises solid particulate indoxacarb at a concentration of about 20.9% w/w or more.

Anticaking Agent

The compositions can comprise one or more anticaking agents. As used herein, the term "anticaking agent" is an additive placed in powdered or granulated materials to prevent the formation of lumps (caking) and for case in packaging, transport, and flowability. Caking mechanisms depend on the nature of the material. Crystalline solids often cake by formation of liquid bridge and subsequent fusion of microcrystals. Amorphous materials can cake by glass transitions and changes in viscosity. Polymorphic phase transitions can also induce caking. The most widely used anticaking agents include the stearates of calcium and magnesium, silica and various silicates, talc, as well as flour and starch. Non-limiting examples of anticaking agents include tricalcium phosphate, crushed limestone, powdered cellulose, magnesium stearate, sodium bicarbonate, sodium ferrocyanide, potassium ferrocyanide, calcium ferrocyanide, bone phosphate (i.e., calcium phosphate), sodium silicate, silicon dioxide, calcium silicate, magnesium trisilicate, talcum powder, sodium aluminosilicate, potassium aluminium silicate, calcium aluminosilicate, bentonite, aluminium silicate, stearic acid, and polydimethylsiloxane. In some aspects, the anticaking agent is crushed limestone.

Environmentally Mimicking Agent

The compositions can comprise one or more environmentally mimicking agents. As used herein, the term "environmentally mimicking agent" can be any powder ingredient that mimics, or is compatible with, the environment of a pest. The environmentally mimicking agent can be an edible ingredient. The environmentally mimicking agent can also be a building material. Additionally, the environmentally mimicking ingredient can mimic material normally found in the environment of the organism without necessarily being of use to the pest as food or building material. When the composition is a delayed acting composition, the environmentally mimicking agent is non-toxic, non-hydrophilic, and prevents desiccation and cuticle shredding exhibited by other, industrially common, environmentally mimicking agents such as carboxylated cellulose.

Non-limiting examples of suitable environmentally mimicking agents include powdered cellulosic materials, powdered clays including powdered attapulgite, powdered bentonite, powdered chitinous materials, powdered montmorillonite, powdered kaolinite, powdered vermiculite, powdered dolomite, calcium silicates, aluminum silicates, and combinations thereof.

Filler

Any filler can be used provided the filler has not demonstrated repellant properties on target pest(s). Non-limiting examples of fillers include carbohydrates, inorganic compounds, inert non-food organic materials, crushed minerals, crushed non-perishable food or food-byproducts and biocompatible polymers, such as polyvinylpirrolydone (PVP). Other non-limiting examples of fillers include dibasic calcium sulfate, tribasic calcium sulfate, starch, calcium carbonate, magnesium carbonate, microcrystalline cellulose, dibasic calcium phosphate, tribasic calcium phosphate, magnesium carbonate, brewer's yeast, corn grit, powdered clays including powdered attapulgite, powdered bentonite, powdered chitinous materials, powdered montmorillonite, powdered kaolinite, powdered vermiculite, powdered dolomite, magnesium oxide, calcium silicate, talc, modified starches, saccharides such as sucrose, dextrose, lactose, microcrystalline cellulose, fructose, xylitol, and sorbitol, polyhydric alcohols; starches; pre-manufactured direct compression diluents; and mixtures of any of the foregoing. In some aspects, the filler is attapulgite.

Suspension Compositions

In some aspects, the composition is formulated as a suspension comprising the solid particulate voltage-dependent sodium channel blocker according to methods well known in the art. As used herein, the term "suspension composition" refers to liquid compositions comprising solid particles of voltage-dependent sodium channel blocker stably distributed somewhat uniformly throughout the suspending medium (suspending vehicle) in which the voltage-dependent sodium channel blocker exhibits a minimum degree of solubility. Accordingly, a suspension composition of the instant disclosure is free of a solvent that can solubilize the voltage-dependent sodium channel blocker.

Suspension compositions can be formulated as a liquid, gel, lotion, aerosol, foam, or cream composition containing, carriers, excipients, and vehicles as desired. Accordingly, in addition to a suspending vehicle, compositions can further comprise ingredients suitable for the intended formulation, including dispersants, stabilizers, surfactants, glidants, antifoaming agents, thickeners, antifreeze agents, solid carriers, chelating agents, antimicrobial agents, release-controlling polymers, and combinations of any thereof. As explained above, one or more of the components can exhibit more than one characteristic of the ingredients of the composition. For instance, when a composition of the disclosure comprises a clay ingredient, the clay can be a suspension aid or a dispersant.

The suspending vehicle can and will vary depending on the particular voltage-dependent sodium channel blocker, the formulation, and the intended use of the composition. In some aspects, the suspending vehicle is an aqueous vehicle. In one aspect the suspending vehicle is water.

A suspension composition further comprises at least one surfactant. In some aspects, the surfactant is a non-ionic surfactant. The inventors surprisingly discovered that a suspension composition of the instant disclosure is significantly more pesticidally effective when the composition further comprises a non-ionic surfactant. In some aspects, the surfactant is a non-ionic siloxane or siloxane-based surfactant. Non-limiting examples of non-ionic siloxane-based surfactants include tri-siloxane surfactants having the general structure $Me_3SiO—SiMeR—OSiMe_3$ such as Break-Thru S 233, Step-Flow 26 F. In one aspect, the non-ionic surfactant is Break-Thru S 233. In one aspect, the surfactant is tristyrylphenol phosphate surfactant (Soprophor FLK).

In some aspects, the suspension composition is a suspension concentrate. As used herein, the term "suspension concentrate" refers to a concentrated form of the suspension composition, wherein the concentrate comprises all the ingredients of the composition in a concentrated form. Accordingly, a suspension concentrate is diluted to a pesticidally effective concentration of voltage-dependent sodium channel blocker prior to application by, e.g., spraying the diluted concentrate. Accordingly, one aspect of the present disclosure encompasses a pesticidal composition comprising a suspension composition obtained from a suspension concentrate, wherein the voltage-dependent sodium channel blocker is at a pesticidally effective concentration suitable for application of the inhibitor. The pesticidally effective concentration can and will vary depending on the voltage-dependent sodium channel blocker, the method of application of the diluted concentrate, the application rate of the diluted concentrate, the target pest to be controlled, and the site where control of a target pest is sought, and can be determined experimentally.

The liquid used for diluting a suspension concentrate of the instant disclosure can and will vary depending on the voltage-dependent sodium channel blocker, suspension concentrate, the method of application of the concentrate, the application rate of the diluted concentrate, the target pest to be controlled, and the site where control of a target pest is sought, and can be determined experimentally. In some aspects, the liquid is the same as the suspending vehicle of the suspension concentrate. For instance, when the suspending vehicle of a suspension concentrate is water, the suspension concentrate can further be diluted into water before application.

Suspension compositions can also be applied onto a carrier such as carrier granules prior to application such as by broadcast distribution. Accordingly, one aspect of the present disclosure encompasses a pesticidal granule comprising a carrier granule having a suspension composition of voltage-dependent sodium channel blockers deposited thereon (voltage-dependent sodium channel blocker granules). In some aspects, the suspension composition deposited onto the carrier granule is a suspension concentrate. In some aspects, the suspension composition deposited onto the carrier granule is a suspension composition diluted from a suspension concentrate.

It will be recognized that a sufficient amount of the suspension composition is deposited onto the carrier granules to provide a pesticidally effective concentration of the inhibitor. The pesticidally effective concentration can and will vary depending on the voltage-dependent sodium channel blocker, the suspension concentrate, the method of depositing the concentrate onto the carrier granules, the application rate of the carrier granules, the target pest to be controlled, and the site where control of a target pest is sought, and can be determined experimentally.

The voltage-dependent sodium channel blocker suspension can be deposited onto carrier granules by simply spraying onto or combining the suspension concentrate with the carrier granules. Alternatively, the voltage-dependent sodium channel blocker can be adhered to the carrier granules using a tackifying agent. A suitable carrier granule is any granule well sized for the method of distribution of the granules, such as by broadcast distribution. For instance, a carrier granule can have a size ranging from about 0.1 millimeter to about 5 centimeters, from about 0.5 to about 2 centimeters, or from about 0.1 to about 5 millimeters. The granules are generally inert towards the suspension concentrate when applied thereon. Suitable carrier granules include fragmented materials such as rock dust, clay, corncob, cereal or grain hulls, peanut hulls, plant pulp, other plant-based cellulosic materials, clays, granular baits, and fertilizers. Non-limiting examples of carrier granules include: limestone particulate; fertilizer granules; and extruded corn granules. In some aspects, the carrier granules disintegrate after distribution. In some aspects, the carrier granules are dissolvable carrier granules. In some aspects, the carrier granules are a fertilizer particle wherein the suspension composition is sprayed thereon for co-application of the fertilizer and voltage-dependent sodium channel blocker. In some aspects, when the granule is a fertilizer granule and the voltage-dependent sodium channel blocker is indoxacarb, the voltage-dependent sodium channel blocker granules comprise indoxacarb ranging from about 6.0% to about 10% indoxacarb by wt, from about 10% to about 15% indoxacarb by wt, from about 15% to about 20% indoxacarb by wt, or from about 20% to about 25% indoxacarb by wt.

In some aspects, the suspension composition comprises solid particulate indoxacarb. In some aspects, the suspension is a suspension concentrate comprising solid particulate indoxacarb. The suspension concentrate can comprise indoxacarb in a concentration ranging from about 0.001% w/w to about 80% w/w or more, from about 0.01% w/w to about 10% w/w, from about 0.05% w/w to about 1% w/w, or from about 0.08% w/w to about 0.7% w/w. In some aspects, the suspension concentrate comprises indoxacarb at a concentration ranging from about 0.01% w/w to about 80% w/w, from about 1% w/w to about 50% w/w, from about 30% w/w to about 60% w/w, or from about 5% w/w to about 15% w/w. In some aspects, the suspension concentrate comprises indoxacarb at a concentration ranging from about 5% w/w to about 15% w/w. In some aspects, the suspension concentrate comprises indoxacarb at a concentration ranging from about 30% w/w to about 60% w/w, or from about 35% w/w to about 55% w/w.

Surfactant

The surfactant can be anionic, cationic surfactants, zwitterionic surfactants, and non-ionic surfactants. Anionic surfactants can be sulfate, sulfonate, and phosphate, carboxylate derivatives. Non-limiting examples of anionic surfactants include ammonium lauryl sulfate, sodium lauryl sulfate (sodium dodecyl sulfate, SLS, or SDS), and the related alkyl-ether sulfates sodium laureth sulfate (sodium lauryl ether sulfate or SLES), and sodium myreth sulfate, docusate (dioctyl sodium sulfosuccinate), perfluorooctanesulfonate (PFOS), perfluorobutanesulfonate, alkyl-aryl ether phosphates, alkyl ether phosphates, sodium stearate, sodium lauroyl sarcosinate and carboxylate-based fluorosurfactants such as perfluorononanoate, and perfluorooctanoate (PFOA or PFO). Non-limiting examples of cationic surfactants include octenidine dihydrochloride, cetrimonium bromide (CTAB), cetylpyridinium chloride (CPC), benzalkonium chloride (BAC), benzethonium chloride (BZT), dimethyldioctadecylammonium chloride, and dioctadecyldimethylammonium bromide (DODAB). Non-limiting examples of zwitterionic surfactants include CHAPS (3-[(3-cholamidopropyl)dimethylammonio]-1-propanesulfonate), lauryldimethylamine oxide, and myristamine oxide. Suitable non-ionic surfactants include emulsifying wax, glyceryl monooleate, polyoxyethylene alkyl ethers, polyoxyethylene castor oil derivatives, polysorbate, sorbitan esters, benzyl alcohol, benzyl benzoate, cyclodextrins, glycerin monostearate, poloxamer, povidone and combinations thereof. In one embodiment, the non-ionic surfactant is stearyl alcohol. Non-limiting examples of non-ionic surfactants include octaethylene glycol monododecyl ether, pentaethylene gly- col monododecyl ether, nonoxynols, Triton X-100, polyethoxylated tallow amine, cocamide monoethanolamine, cocamide diethanolamine, polaxamers, glycerol monostearate, glycerol monolaurate, sorbitan monolaurate, sorbitan monostearate, sorbitan tristearate, Tween 20, Tween 40, Tween 60, Tween 80, decyl glucoside, lauryl glucoside, octyl glucoside, siloxane surfactants, and combinations thereof.

Suspension Aid

A suspension aid can be added to help maintain the solid particulate voltage-dependent sodium channel blocker in suspension, thus improving the particle's resistance to settle statically and flow under shear or rheological shear-thinning. Suitable suspension aids include, but are not limited to, water soluble polymers such as 3-butoxy-2-hydroxypropylhydroxyethylcellulose, acrylamide homo- and copolymers, acrylic acid homo- and copolymer, alginates, carboxymethylcellulose (sodium and other salts), carboxymethylhydroxyethylcellulose, carboxy-vinyl copolymers, cellulose, guar gum, gum arabic; hydrophobically modified hydroxyethylcellulose, hydroxyethylcellulose, hydroxypropyl guar, hydroxypropyl methylcellulose, hydroxypropylcellulose, natural gums and their derivatives, partially and fully hydrolyzed polyvinyl alcohols, partially neutralized polyacrylic acid, polyalkylene glycol, polysaccharide gums, polyvinylpyrrolidone and derivatives, sodium carboxymethylcellulose, starch and its derivatives, vinylpyrrolidone homo- and copolymers, water-soluble cellulose ethers, xanthan gum, and mixtures thereof. Other suspension aids can be silica powder prepared by precipitating water glass (sodium silicate) with sulfuric acid, which is then dried and sold as a fine powder. The silica powder provides a rheology control and aids in suspension by preventing particle settling. Still another suspension aid material can be fumed alumina. Alumina or aluminium oxide is an amphoteric oxide of aluminium with the chemical formula AL2O3. Fumed alumina is made of primary particles which sinter together to form aggregates. These alumina aggregates have a chain-like structure and an average diameter of 150 nm (for primary particle size of 20 nm). It also provides a rheology control and lubrication for the particle suspension. Clays can also be used as suspension aids. Such clays include bentonite, laponites, kaolinite, dickite, and nacrite, with the general formula of Al2Si2O5(OH)4; pyrophylite, talc, vermiculite, sauconite, saponte, nontronite, and montmorillonite with the general chemical formula (Ca, Na, H) (Al, Mg, Fe, Zn)2 (Si, Al)4O10(OH)2·xH2O; attapulgite with the general chemical formula Mg5Si8O20(HO)2(OH2)4·4H2O; and illite with the general formula (K, H) A12(Si, Al)4O10(OH)2·xH2O, and organically modified montmorillonite clays.

Dispersant

The dispersant, in combination with at least one surfactant (described below), stabilizes the resulting aqueous formulation by lowering the surface tension and preventing agglomeration of the spore particles.

The dispersant can be ionic or non-ionic and polymeric in structure. Ionic water soluble polymers include lignin-based dispersants such as lignin sulfonates, which are water soluble polymers that carry ionic charge along the backbone chain, including ammonium, sodium, calcium and magnesium ions.

Anti-Foaming Agent

An anti-foaming agent or a defoamer is a chemical additive that reduces and hinders the formation of foam in industrial process liquids. The terms anti-foam agent and defoamer are often used interchangeably. Strictly speaking, defoamers eliminate existing foam, and anti-foamers prevent the formation of further foam. Commonly used agents are insoluble oils, polydimethylsiloxanes and other silicones, certain alcohols, stearates and glycols. The additive is used to prevent formation of foam or is added to break a foam already formed. Oil-based defoamers have an oil carrier. The oil might be mineral oil, vegetable oil, white oil, or any other oil that is insoluble in the foaming medium, except silicone oil. An oil-based defoamer can also contain a wax and/or hydrophobic silica to boost the performance. Typical waxes are ethylene bis stearamide (EBS), paraffin waxes, ester waxes, and fatty alcohol waxes. These products might also have surfactants to improve emulsification and spreading in the foaming medium. Powder defoamers are in principle oil-based defoamers on a particulate carrier like silica. Water-based defoamers are different types of oils and waxes dispersed in a water base. The oils are often mineral oil or vegetable oil and the waxes are long chain fatty alcohol, fatty acid soaps, or esters. Silicone-based defoamers are polymers with silicon backbones. These might be delivered as an oil or a water-based emulsion. The silicone compound consists of a hydrophobic silica dispersed in a silicone oil. Emulsifiers are added to ensure that the silicone spreads fast and well in the foaming medium. The silicone compound might also contain silicone glycols and other modified silicone fluids. These are also heavy duty defoamers and are good at both knocking down surface foam and releasing entrained air. Silicone-based defoamers are also suitable in non-aqueous foaming systems like crude oil and oil refining. For very demanding applications, fluorosilicones may be suitable. EO/PO based defoamers contain polyethylene glycol and polypropylene glycol copolymers. They are delivered as oils, water solutions, or water-based emulsions. EO/PO copolymers normally have good dispersing properties and are often well suited when deposit problems are an issue. Alkyl polyacrylates are suitable for use as defoamers in non-aqueous systems where air release is more important than the breakdown of surface foam. These defoamers are often delivered in a solvent carrier like petroleum distillates. In some aspects, the anti-foaming agent is a silicone-based anti-foaming agent such as SAG 30.

Antifreeze Agents

Any substance capable of lowering the freezing point of water and protecting a system from the ill effects of ice formation can be used in the instant disclosure, provided the antifreeze is compatible with the compositions of the disclosure. Non-limiting examples of antifreezes include ethylene glycol or propylene glycol, methanol, isopropanol, glycerol, dimethyl sulfoxide, trehalose, and combinations thereof.

Other Ingredients

Other ingredients that may be used in compositions of the instant disclosure include diluents, preservatives, chelating agents, and antimicrobial agents, among others. These ingredients are described in greater detail below.

Pesticidal Ingredient

The composition can comprise one or more pesticides in addition to the solid particulate voltage-dependent sodium channel blocker. The additional component can be in the particles or it can be in the composition, it can be solid or not, depending on the function of the pesticide.

Pesticides are defined as chemicals used to kill pests. Pesticides include insecticides and acaricides. The pesticides can be ingestion-active or systemic pesticides. Alternatively, the pesticides can be contact pesticides. Pesticides can be ovicides or substances that kill eggs, larvicides or substances that kill larvae, or adulticides or substances that kill adult insects. Several types of pesticides are described in more detail below.

Irrespective of the type of pesticide, the pesticide and the concentration of the pesticide must be appropriate for the desired activity of the composition. For instance, when a composition is a delayed acting composition for translocation into a colony or to be shared among pests in the environment of the pest, the type and amount of pesticides in the composition must allow sufficient activity latency to facilitate translocation of the composition to other pests. Delayed activity can be inherent to the pesticide. Alternatively, the delayed activity can be controlled by the concentration of the pesticide in the composition. As such, the concentration of a pesticide in a composition of the disclosure can and will vary depending on the pesticide, the target pest among others, and can be determined experimentally for each pesticide.

Insecticides

An insecticide is a pesticide used against insects in all developmental forms. Insecticides are commonly used in agriculture, medicine, industry, and for household use. Representative insecticides useful in the present invention include pyrethrum type insecticides, such as pyrethrin; pyrethroids, such as deltamethrin, permethrin, β-cyfluthrin, bifenthrin, and resmethrin; nicotinics, particularly chloronicotinyl compounds, such as acetamiprid, imidacloprid, thiamethoxam, clothianidin, acetamiprid, thiacloprid, and dinotefuran; pyrazoles such as fipronil, ethiprole, and tebufenpyrad; semicarbazones such as indoxacarb and metaflumizone, phthalic acid diamides such as flubendiamide and(S)-3-chloro-N1-{2-methyl-4-[1,2,2,2-tetrafluoro-1-(trifluoromethyl)ethyl]phenyl}-N2-(1-methyl-2-methylsulfonylethyl) phthalamide; anthranilic acid amides such as chloroanthraniliprole; organophosphates such as chlorpyrifos, malathion, and diazinon; carbamates such as bendiocarb, carbaryl, and thiodicarb; ketoenoles such as spirotetramat, spirodiclofen, and spiromesifen; phthalic acid diamides such as insecticides with an active ingredients from the anthranilic diamide class such as that sold by DuPont under the tradename Rynaxypyr (hereinafter referred to a rynaxypyr for ease of reference), and flubendiamide; IGRs such as methoprene, pyriproxifen, triflumuron, hexaflumuron, noviflumuron, fenoxycarb; and other insecticides, such as abamectin, hydramethylnon, sulfluramid, and spinosad. Representative chlorinated hydrocarbons include aldrin, chlordane, chlordecone, DDT, dieldrin, endosulfan, endrin, heptachlor, hexachlorocyclohexane, gamma-hexachlorocyclohexane, lindane, methoxychlor, mirex, pentachlorophenol, and TDE. Representative organophosphorus insecticides include acephate, azinphos-methyl, bensulide, chlorethoxyfos, chlorpyrifos, chlorpyriphos-methylm diazinon, dichlorvos (DDVP), dicrotophos, dimethoate, disulfoton, ethoprop, fenamiphos, fenitrothion, fenthion, fosthiazate, malathion, methamidophos, methidathion, methyl-parathion, mevinphos, naled, omethoate, oxydemeton-methyl, parathion, phorate, phosalone, phosmet, phostebupirim, pirimiphos-methyl, profenofos, terbufos, tetrachlorvinphos, tribufos, trichlorfon. Representative carbamates include aldicarb, carbofuran, carbaryl, methomyl, and 2-(1-methylpropyl)phenyl methylcarbamate. Representative pyrethroids include allethrin, beta-cyfluthrin, bifenthrin, cyfluthrin, deltamethrin, permethrin, resmethrin, sumithrin, tetramethrin, tralomethrin, and transfluthrin. Representative plant toxin derived insecticides include derris (rotenone), pyrethrum, neem (azadirachtin), nicotine, caffeine, and compositions thereof.

Additional insecticides include cyclic ketoenols with insecticidal and acaricidal properties, such as those described in EP 528 156 A, WO 95/01971, EP 647 637 A, WO 96/16061, WO 96/20196, WO 96/25395, WO 96/35664, WO 97/02243, WO 97/01535, WO 97/36868, WO 97/43275, WO 98/05638, WO 98/06721, WO 99/16748, WO 99/43649, WO 99/48869, and WO 99/55673, each hereby incorporated by reference with regard to such teaching. Certain pesticides are exempt from the requirements of the FIFRA act (40 CFR 152.25 (f)). They are commonly known as minimum risk pesticides. Examples of these pesticides include castor oil (U.S.P. or equivalent), cedar oil, cinnamon and cinnamon oil, citric acid, citronella and citronella oil, cloves and clove oil, corn gluten meal, corn oil, cottonseed oil, dried blood, eugenol, garlic and garlic oil, geraniol, geranium oil, lauryl sulfate, lemongrass oil, linseed oil, malic acid, mint and mint oil, peppermint and peppermint oil, 2-phenethyl propionate (2-phenylethyl propionate), potassium sorbate, putrescent whole egg solids, rosemary and rosemary oil, sesame (includes ground sesame plant) and sesame oil, sodium chloride (table salt), sodium lauryl sulfate, soybean oil, thyme and thyme oil, and white pepper.

Numerous heterocycles, organotin compounds, benzoylureas and pyrethroids have insecticidal and acaricidal properties, for example, see WO 93/22297, WO 93/10083, DE 2 641 343 A, EP 347 488 A, EP 210 487 A, U.S. Pat. No. 3,264,177, and EP 234 045 A, each herein incorporated by reference with regard to such teaching.

Certain bacteria, fungi, and other biological material may be active as insecticides. When these biological insecticides are inactive against other organisms, some are considered more environmentally friendly than synthetic pesticides. Examples include, but are not limited to, *Bacillus sphericus, Bacillus subtilis, Bacillus cereus*, or combinations of such material.

In some aspects, the pesticide is abamectin, acetamiprid, borax (sodium tetraborate), boric acid, boron sodium oxide, chlorantraniliprole, cyantraniliprole, chlorfenapyr, copper ammonium carbonate, copper carbonate, basic, copper hydroxide, copper quinolate, cupric oxide, diflubenzuron, dinotefuran, fipronil, hexaflumuron, hydramethylnon, imidacloprid, indoxacarb, novaluron, noviflumuron, pyriproxyfen, sodium borate pentahydrate, tebuconazole, thiamethoxam, or combinations thereof. In some aspects, the pesticide is fipronil, indoxacarb, novaluron, pyriproxyfen, chlorfenapyr, or combinations thereof.

Acaricides

Any suitable acaracide can be used. Examples of suitable acaricides include sumiito (2-tert-butyl-5-(4-tert-butylbenzylthio)-4-chloropyridazine-3-(2H)-one), acricid (2,4-dinitro-6-sec-butylphenyldimethylacrylate), chloromite (isopropyl 4,4-dichlorobenzylate), Akar (ethyl 4,4'-dichlorobenzilate), kelthane (2,2,2trichloro-1,1-bis(p-chlorophenyl)-ethanol), citrazon (benzoic 3-chloro-N-ethoxy-2,6-dimethoxybenzimidic anhydride), omite (2-(p-tert-butylphenoxy)cyclohexyl propyn-2-yl sulfite), osadan (bis [tris(2-methyl-2-phenylpropyl)tin]oxide), hexythiazox (trans-5-(4-chlorophenyl)-N-cyclohexyl-4-methyl-2-oxothiazol-idine-3-carboxamide), and amitraz (N,N-bis(2,4-xylyliminomethyl)methylamine).

Preservatives

Non-limiting examples of preservatives include, but are not limited to, ascorbic acid and its salts, ascorbyl palmitate, ascorbyl stearate, anoxomer, N-acetylcysteine, benzyl isothiocyanate, m-aminobenzoic acid, o-aminobenzoic acid, p-aminobenzoic acid (PABA), butylated hydroxyanisole (BHA), butylated hydroxytoluene (BHT), caffeic acid, canthaxantin, alpha-carotene, beta-carotene, beta-caraotene, beta-apo-carotenoic acid, carnosol, carvacrol, catechins, cetyl gallate, chlorogenic acid, citric acid and its salts, clove extract, coffee bean extract, p-coumaric acid, 3,4-dihydroxy-benzoic acid, N,N'-diphenyl-p-phenylenediamine (DPPD), dilauryl thiodipropionate, distearyl thiodipropionate, 2,6-di-tert-butylphenol, dodecyl gallate, edetic acid, ellagic acid, erythorbic acid, sodium erythorbate, esculetin, esculin, 6-ethoxy-1,2-dihydro-2,2,4-trimethylquinoline, ethyl gallate, ethyl maltol, ethylenediaminetetraacetic acid (EDTA), *eucalyptus* extract, eugenol, ferulic acid, flavonoids (e.g., catechin, epicatechin, epicatechin gallate, epigallocatechin (EGC), epigallocatechin gallate (EGCG), polyphenol epigallocatechin-3-gallate), flavones (e.g., apigenin, chrysin, luteolin), flavonols (e.g., datiscetin, myricetin, daemfero), flavanones, fraxetin, fumaric acid, gallic acid, gentian extract, gluconic acid, glycine, gum guaiacum, hesperetin, alpha-hydroxybenzyl phosphinic acid, hydroxycinammic acid, hydroxyglutaric acid, hydroquinone, N-hydroxysuccinic acid, hydroxytryrosol, hydroxyurea, rice bran extract, lactic acid and its salts, lecithin, lecithin citrate; R-alpha-lipoic acid, lutein, lycopene, malic acid, maltol, 5-methoxy tryptamine, methyl gallate, monoglyceride citrate; monoisopropyl citrate; morin, beta-naphthoflavone, nordihydroguaiaretic acid (NDGA), octyl gallate, oxalic acid, palmityl citrate, phenothiazine, phosphatidylcholine, phosphoric acid, phosphates, phytic acid, phytylubichromel, pimento extract, propyl gallate, polyphosphates, quercetin, trans-resveratrol, rosemary extract, rosmarinic acid, sage extract, sesamol, silymarin, sinapic acid, succinic acid, stearyl citrate, syringic acid, tartaric acid, thymol, tocopherols (i.e., alpha-, beta-, gamma- and delta-tocopherol), tocotrienols (i.e., alpha-, beta-, gamma- and delta-tocotrienols), tyrosol, vanilic acid, 2,6-di-tert-butyl-4-hydroxymethylphenol (i.e., Ionox 100), 2,4-(tris-3',5'-bi-tert-butyl-4'-hydroxybenzyl)-mesitylene (i.e., Ionox 330), 2,4,5-trihydroxybutyrophenone, ubiquinone, tertiary butyl hydroquinone (TBHQ), thiodipropionic acid, trihydroxy butyrophenone, tryptamine, tyramine, uric acid, vitamin K and derivates, vitamin Q10, wheat germ oil, zeaxanthin, or combinations thereof.

Chelating Agents

A chelating agent may be included as an excipient to immobilize oxidative groups, including but not limited to metal ions, in order to inhibit the oxidative degradation of the morphinan by these oxidative groups. Non-limiting examples of chelating agents include lysine, methionine, glycine, gluconate, polysaccharides, glutamate, aspartate, and disodium ethylenediaminetetraacetate (Na2EDTA).

Antimicrobial Agents

An antimicrobial agent may be included as an excipient to minimize the degradation of the compound according to this disclosure by microbial agents, including but not limited to, bacteria and fungi. Non-limiting examples of antimicrobials include parabens, chlorobutanol, phenol, calcium propionate, sodium nitrate, sodium nitrite, Na2EDTA, and sulfites including but not limited to sulfur dioxide, sodium bisulfite, and potassium hydrogen sulfite.

Coloring Agents

Coloring agents can be included in the composition. Suitable color additives include, but are not limited to, food, drug and cosmetic colors (FD&C), drug and cosmetic colors (D&C), external drug and cosmetic colors (Ext. D&C), or fluorescent dyes.

Attractant

The term "attractant," as employed herein, refers to any substance which a pest will find appealing as a food item such that it will tend to transport it back to the nest, and expressly includes foods, baits, attractants and feeding stimulants, as well as combinations thereof.

Suitable ingredients can be an ingredient perceived as a food by the pest. The food attractant can and will vary depending on the pest, the method of using the composition, and the intended use of the composition. For instance, when the pest is a termite, non-limiting examples of a food attractant can be brown rot derivatives, scorched cellulosic material, edible fungus derivatives, and long-chain fatty acids. When the pest is a roach, non-limiting examples of a food attractant can be brewer's yeast, corn grit, sugar, gelatin, powdered organ meats, powdered cheese, brown rot derivatives, scorched cellulosic material, edible fungus derivatives, and long-chain fatty acids.

Alternatively, the attractant can be a non-edible attractant. For instance, a suitable attractant can be semiochemicals that mimic pest attraction systems found in nature. Non-limiting examples of semiochemicals include pheromones, plant volatiles, flower oils, sugars, and proteins.

Specific Compositions

One aspect of the present disclosure encompasses a pesticidal suspension composition comprising a solid particulate voltage-dependent sodium channel blocker. In some aspects, the suspension composition is a suspension concentrate.

In some aspects, the pesticidal suspension composition is a suspension comprising about 5% w/w to about 10% w/w solid particulate indoxacarb; about 1% w/w to about 3% w/w of one or more anionic surfactants; about 0.1% w/w to about 0.8% w/w of an anti-foaming agent; about 3% w/w to about 5% w/w propylene glycol; about 0.1% w/w to about 0.5% w/w xanthan powder; about 0.1% w/w to about 0.5% w/w of one or more preservatives; and about 80% w/w to about 90% w/w water.

In some aspects, the pesticidal suspension composition is a suspension comprising about 15% w/w to about 30% w/w solid particulate indoxacarb; about 0.1% w/w to about 0.5% w/w xanthan powder; about 0.1% w/w to about 0.5% w/w preservative; about 3.0% w/w to about 6.0% w/w dispersant; about 1% w/w to about 2.0% w/w non-ionic surfactant; about 10% w/w to about 15% w/w propylene glycol; about 1.0% w/w to about 3.0% w/w anti-foaming agent; and about 40% w/w to about 60% w/w water.

In some aspects, the pesticidal suspension composition is a suspension comprising about about 5% w/w to about 10% w/w solid particulate indoxacarb; about 1% w/w to about 2% w/w of pyridine-based pesticide (Pyriproxyfen Tech); about 1% w/w to about 2% w/w of Novaluron; about 1% w/w to about 3% w/w of one or more anionic surfactants (Aerosol OT-75Å, Soprophor FLK); about 0.1% w/w to about 0.8% w/w anti-foaming agent (Agnique DFM111S); about 3% w/w to about 5% w/w propylene glycol; about 0.1% w/w to about 0.5% w/w xanthan powder (Ticaxan pre-hydrated Xanthan); about 0.1% w/w to about 0.5% w/w preservative (Proxel GXL); and about 80% w/w to about 90% w/w water.

In some aspects, the pesticidal suspension composition is a suspension comprising about about 5% w/w to about 10% w/w solid particulate indoxacarb; about about 5% w/w to about 10% w/w solid particulate imidacloprid; about 0.1% w/w to about 0.5% w/w xanthan powder (Ticaxan pre-hydrated Xanthan); about 0.1% w/w to about 0.5% w/w preservative (Proxel GXL); about 0.1% w/w to about 1.0% w/w dispersant (Atlox 4913); about 0.5% w/w to about 1.5% w/w anti-foaming agent (SAG 30); about 5% w/w to about 15% w/w propylene glycol; about 3% w/w to about 10% w/w non-ionic surfactant (Step Flow 26F); about 0.1% w/w to about 1% w/w Soprophor FLK; and about 60% w/w to about 70% w/w water.

II. Methods

One aspect of the present disclosure encompasses a method of controlling a target pest. The method comprises contacting the pest with a pesticidally effective amount of a composition comprising a pesticidally effective concentration of a pesticidally active solid particulate voltage-dependent sodium channel blocker. The composition can be as described in Section I above.

A pesticidally effective amount may be determined by the efficacy or potency of the particular composition, the pest being controlled, the duration or frequency of application of the pesticidal composition, and the method of application of the composition. A pesticidally effective amount can be determined using methods known in the art, and can be determined experimentally. Additionally, the method of application may be considered when determining the pesticidally effective amount. In determining pesticidally effective amounts, one skilled in the art may also consider the existence of resistance of the pest to pesticides. Importantly, the pest can be contacted at any stage of development of the pest. This is because the method can control current and future pest generations independent of application timing with respect to the life stage of the pest.

Another aspect of the instant disclosure encompasses a method of treating pest infestations in animals. The method comprising pouring onto the external skin of the animal to be treated an effective amount of a pesticidal suspension composition for control of pests on animals, wherein the pesticidal suspension composition is capable of diffusing over the body of the domestic animal when applied to a localized region of the domestic animal, thereby protecting the animal from pests. The pesticidal suspension composition can be as described in Section I above.

The animals can be cattle, and the pests can be ectoparasites such as horn flies and lice. In some aspects, the animals are cattle, and the pests and horn flies. In other aspects, the animals are cattle, and the pests and lice.

III. Kits

A further aspect of the present disclosure provides kits comprising one or more pesticidal compositions comprising a pesticidally effective concentration of a pesticidally active solid particulate voltage-dependent sodium channel blocker detailed above. The one or more pesticidal compositions may be administered by a method described above.

The kits may further comprise a suspending vehicle appropriate for diluting a suspension concentrate composition. The compositions can be packaged in one or more containers. The containers can further comprise means of administering or measuring the compositions. For instance, if the composition is a suspension concentrate, the container may further comprise a means of spraying the composition, and a measuring cup for measuring an appropriate volume of the concentrate for dilution. When the composition is a powder composition, the container can be a container operable to spray the powder.

The kits provided herein generally include instructions for carrying out the methods detailed above. Instructions included in the kits may be affixed to packaging material or may be included as a package insert. While the instructions are typically written or printed materials, they are not limited to such. Any medium capable of storing such instructions and communicating them to an end user is contemplated by this disclosure. Such media include, but are not limited to, electronic storage media (e.g., magnetic discs, tapes, cartridges, chips), optical media (e.g., CD ROM), and the like. As used herein, the term "instructions" may include the address of an internet site that provides the instructions.

Definitions

Unless defined otherwise, all technical and scientific terms used herein have the meaning commonly understood by a person skilled in the art to which this invention belongs. The following references provide one of skill with a general definition of many of the terms used in this invention: Singleton et al., Dictionary of Microbiology and Molecular Biology (2nd ed. 1994); The Cambridge Dictionary of Science and Technology (Walker ed., 1988); The Glossary of Genetics, 5th Ed., R. Rieger et al. (eds.), Springer Verlag (1991); and Hale & Marham, The Harper Collins Dictionary of Biology (1991). As used herein, the following terms have the meanings ascribed to them unless specified otherwise.

When introducing elements of the present disclosure or the preferred aspects(s) thereof, the articles "a", "an", "the" and "said" are intended to mean that there are one or more of the elements. The terms "comprising", "including" and "having" are intended to be inclusive and mean that there may be additional elements other than the listed elements.

The term "pesticidally effective amount" as used herein refers to an amount effective, at dosages, and for periods of time necessary, to achieve the desired result with respect to the control of a pest. For example, in the control of an agricultural pest, an agent (i.e., a compound or a composition) which decrease, prevents, delays or suppresses or arrests damage to an agricultural crop caused by a pest would be effective. The pesticidally effective amount may be divided into one, two or more applications in a suitable form to be applied one, two or more times throughout a designated time period.

As various changes could be made in the above-described cells and methods without departing from the scope of the invention, it is intended that all matter contained in the above description and in the examples given below, shall be interpreted as illustrative and not in a limiting sense.

EXAMPLES

All patents and publications mentioned in the specification are indicative of the levels of those skilled in the art to which the present disclosure pertains. All patents and publications are herein incorporated by reference to the same extent as if each individual publication was specifically and individually indicated to be incorporated by reference.

The publications discussed throughout are provided solely for their disclosure before the filing date of the present application. Nothing herein is to be construed as an admission that the invention is not entitled to antedate such disclosure by virtue of prior invention.

The following examples are included to demonstrate the disclosure. It should be appreciated by those of skill in the art that the techniques disclosed in the following examples represent techniques discovered by the inventors to function well in the practice of the disclosure. Those of skill in the art should, however, in light of the present disclosure, appreciate that many changes could be made in the disclosure and still obtain a like or similar result without departing from the spirit and scope of the disclosure, therefore all matter set forth is to be interpreted as illustrative and not in a limiting sense.

Example 1: Preparation of Pesticidal Suspension Compositions

Five pesticidal suspension compositions were prepared. The compositions are listed in Tables 1-5.

TABLE 1

Pesticidal suspension 1

| Ingredient | % w/w |
|---|---|
| Indoxacarb Tech 9:1 | 6.93 |
| Aerosol OT-75Â | 1.13 |
| Soprophor FLK (441 lb Drum) | 2.00 |
| Agnique DFM111S 40 lb. pail | 0.25 |
| Propylene Glycol | 3.87 |
| Ticaxan pre-hydrated Xanthan | 0.30 |
| Proxel GXL (440 lb drum) | 0.20 |
| Proxel BN (440 lb drum) | 0.20 |
| Water | 85.13 |

TABLE 2

Pesticidal suspension 2

| Ingredient | % w/w |
|---|---|
| Indoxacarb Tech 9:1 | 6.92 |
| Pyriproxyfen Tech | 1.33 |
| Novaluron Technical 98.5% | 1.31 |
| Aerosol OT-75Â 475 lb drum | 1.13 |
| Soprophor FLK (441 lb Drum) | 2.00 |
| Agnique DFM111S | 0.25 |
| Propylene Glycol | 3.87 |
| Ticaxan pre-hydrated Xanthan | 0.30 |
| Proxel GXL (440 lb drum) | 0.4 |
| Water | 85.13 |

TABLE 3

Pesticidal suspension 3

| Ingredient | % w/w |
|---|---|
| Indoxacarb Tech 9:1 | 22.6 |
| Xantham Gum-FG 200 mesh ADM | 0.23 |
| Proxel GXL (440 lb drum) | 0.43 |
| Atlox 4913 | 5.22 |
| Ethylan | 1.74 |
| Propylene Glycol | 13.04 |
| SAG 30/AF 30 | 1.74 |
| Water | 54.99 |

TABLE 4

Pesticidal suspension 4

| Ingredient | % w/w |
|---|---|
| Indoxacarb Tech 9:1 | 7.0331 |
| Imidacloprid Technical (98.2%) | 6.6191 |
| Pyriproxyfen (98.4%) | 1.3211 |
| Xanthan Gum | 0.2000 |
| Proxel GXL | 0.2000 |
| Atlox 4913 | 1.5000 |
| Step Flow 26F | 1.5000 |
| Ethox 4420 | 2.5000 |
| Propylene Glycol | 10.0000 |
| SAG 30 | 1.0000 |
| Soprophor FLK | 1.0000 |
| Polysorbate 80 | 3.0000 |
| Water | 64.1266 |

TABLE 5

Pesticidal suspension 5

| Ingredient | % w/w |
|---|---|
| Indoxacarb Tech 9:1 | 7.0331 |
| Imidacloprid Technical (98.2%) | 6.6191 |
| Xanthan Gum | 0.2000 |
| Proxel GXL | 0.2000 |
| Atlox 4913 | 0.5000 |
| Step Flow 26F | 6.0000 |
| Propylene Glycol | 10.0000 |
| SAG 30 | 1.0000 |
| Soprophor FLK | 1.0000 |
| Water | 67.9477 |

Figure 1A:
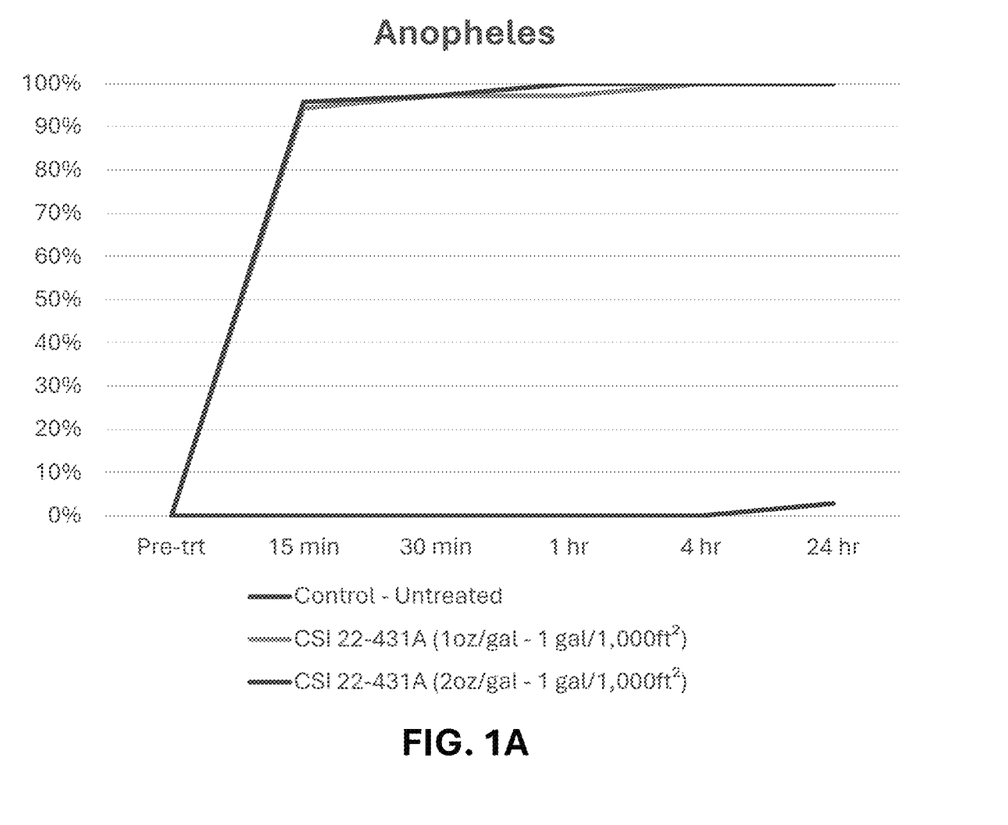
FIG. 1A is a graph showing mean percent mortality of mosquitoes exposed to indoxacarb suspension concentration according to some embodiments of the present disclosure.
Figure 1B:
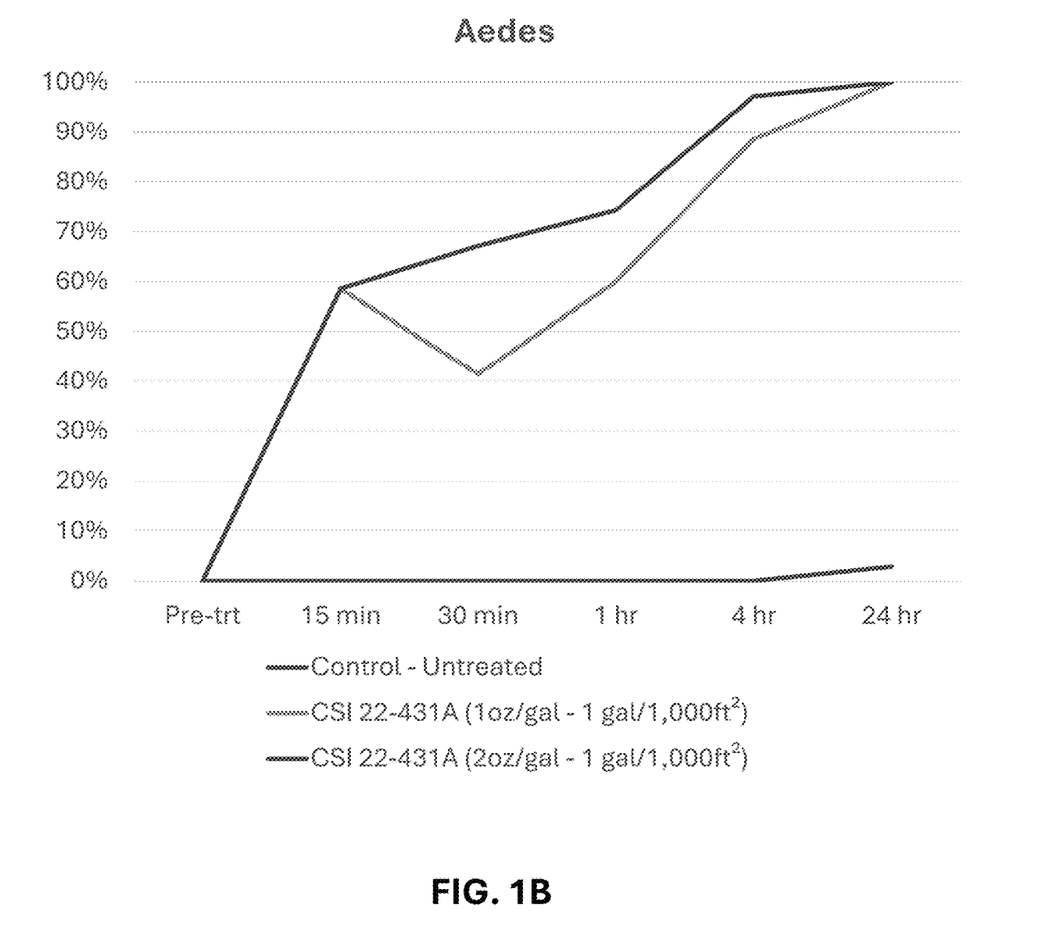
FIG. 1B is a graph showing mean percent mortality of mosquitoes exposed to indoxacarb suspension concentration according to some embodiments of the present disclosure.
Figure 1C:
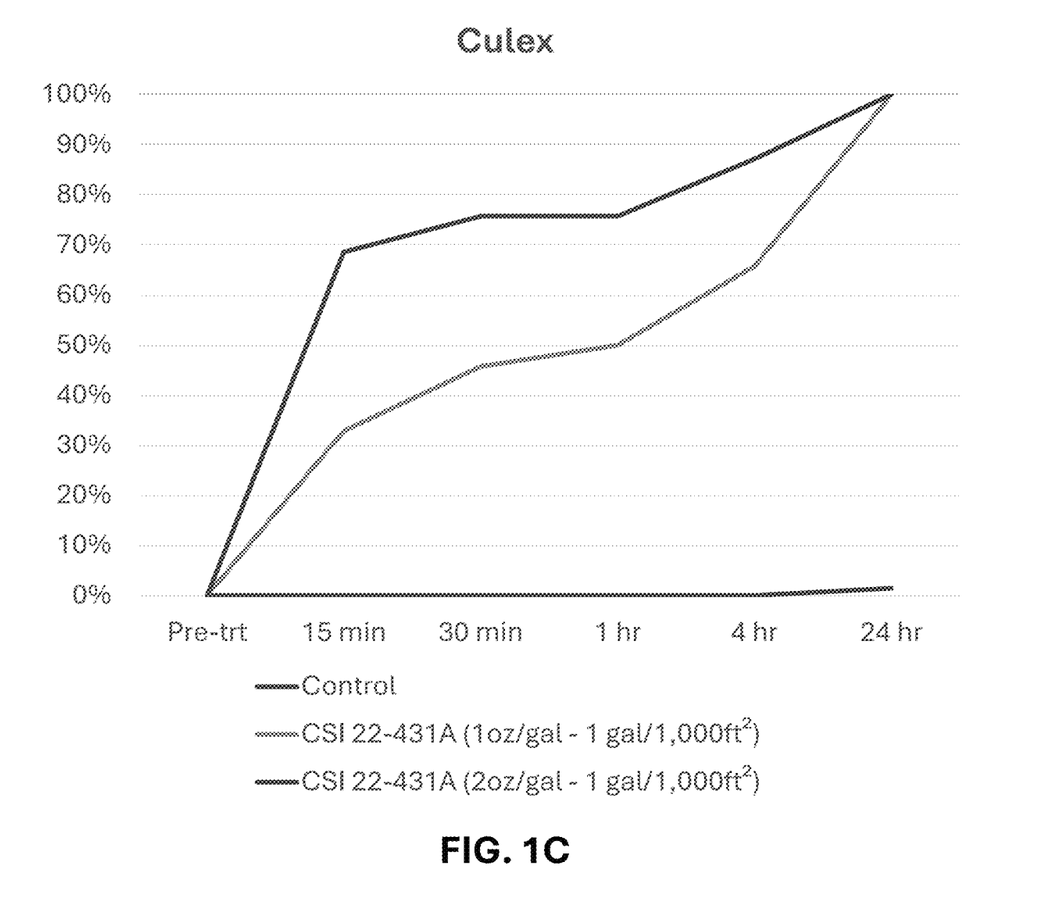
FIG. 1C is a graph showing mean percent mortality of mosquitoes exposed to indoxacarb suspension concentration according to some embodiments of the present disclosure.

Example 2: Evaluation of Pesticidal Suspension Compositions as a Direct Spray Application Against Three Genera of Adult Public Health Pest Mosquitoes A laboratory efficacy study comparing a single application of two rates of the test substance compared to a negative control when sprayed directly to mosquitoes was conducted. Following test substance application and pest exposure to the treatments, observations were made on the experimental units at 15 min., 30 min., 1 h., 4 h., 24 h., 48 h., 72 h., and 96 h. FIG. 1A shows the graph of mean percent mortality of *Anopheles* mosquitoes exposed to Index SC. FIG. 1B shows the graph of mean percent mortality of *Aedes* mosquitoes exposed to Index SC. FIG. 1C shows the graph of mean percent mortality of *Culex* mosquitoes exposed to Index SC. FIGS. 1A-1C show Index SC was effective against all three mosquito species when applied as direct spray.

Figure 2:
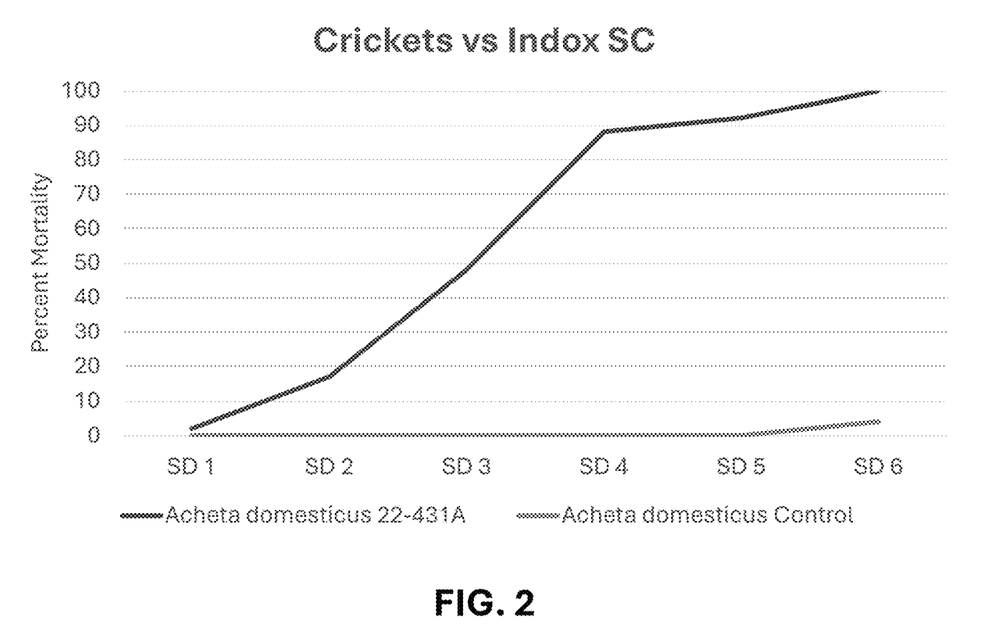
FIG. 2 is a graph showing mean percent mortality of crickets exposed to indoxacarb suspension concentration according to some embodiments of the present disclosure.

Example 3: Evaluation of Pesticidal Suspension Compositions Vs. Occasional Invaders in Mulch A laboratory efficacy study comparing the residual application (30d) of the lowest label rate of the test substance to negative controls when applied to the top of mulch was conducted. Cricket control was too high for the 30d study and was re-ran for 24 hr after unsatisfactory results with pillbugs and millipedes with 30d residuals. Following test substance application, daily (repeated) observations were made on the experimental units for 14 days. FIG. 2 shows percent mortality of crickets over 6 days to 24 hour aged.

What is claimed is:

1. A pesticidal suspension composition for controlling pests on animals comprising:
   (a) about 5% w/w to about 10% w/w solid particulate indoxacarb;
   (b) about 1% w/w to about 3% w/w of one or more anionic surfactants;
   (c) about 0.1% w/w to about 0.8% w/w anti-foaming agent;
   (d) about 3% w/w to about 5% w/w propylene glycol;
   (e) about 0.1% w/w to about 0.5% w/w xanthan powder;
   (f) about 0.1% w/w to about 0.5% w/w of one or more preservatives; and
   (g) about 80% w/w to about 90% w/w water.

2. A pesticidal suspension composition for controlling pests on animals comprising a voltage-dependent sodium channel blocker, the composition comprising:
   (a) about 15% w/w to about 30% w/w solid particulate indoxacarb;
   (a) about 0.1% w/w to about 0.5% w/w xanthan powder;

(b) about 0.1% w/w to about 0.5% w/w preservative;
(c) about 3.0% w/w to about 6.0% w/w dispersant;
(d) about 1% w/w to about 2.0% w/w non-ionic surfactant;
(e) about 10% w/w to about 15% w/w propylene glycol;
(f) about 1.0% w/w to about 3.0% w/w anti-foaming agent; and
(g) about 40% w/w to about 60% w/w water.

3. A pesticidal suspension composition for controlling pests on animals comprising a voltage-dependent sodium channel blocker, the composition comprising:
(a) about 5% w/w to about 10% w/w solid particulate indoxacarb;
(b) about 5% w/w to about 10% w/w imidacloprid;
(c) about 0.1% w/w to about 0.5% w/w xanthan powder;
(d) about 0.1% w/w to about 0.5% w/w preservative;
(e) about 3.0% w/w to about 6.0% w/w dispersant;
(f) about 1% w/w to about 2.0% w/w non-ionic surfactant;
(g) about 5% w/w to about 15% w/w propylene glycol;
(h) about 0.5% w/w to about 3.0% w/w anti-foaming agent;
(i) about 0.5% w/w to about 1.0% w/w non-ionic siloxane-based surfactant; and
(j) about 50% w/w to about 70% w/w water.

4. The composition of claim 1, wherein a target pest is an adult pest.

5. The composition of claim 1, wherein the animals are cattle.

6. The composition of claim 1, wherein the pests are ectoparasites.

7. The composition of claim 1, wherein the pests are horn flies.

8. The composition of claim 1, wherein the pests are lice.

9. The composition of claim 2, wherein a target pest is an adult pest.

10. The composition of claim 2, wherein the animals are cattle.

11. The composition of claim 2, wherein the pests are ectoparasites.

12. The composition of claim 2, wherein the pests are horn flies.

13. The composition of claim 2, wherein the pests are lice.

14. The composition of claim 3, wherein a target pest is an adult pest.

15. The composition of claim 3, wherein the animals are cattle.

16. The composition of claim 3, wherein the pests are ectoparasites.

17. The composition of claim 3, wherein the pests are horn flies.

18. The composition of claim 3, wherein the pests are lice.

\* \* \* \* \*